United States Patent Office 2,790,125
Patented Apr. 23, 1957

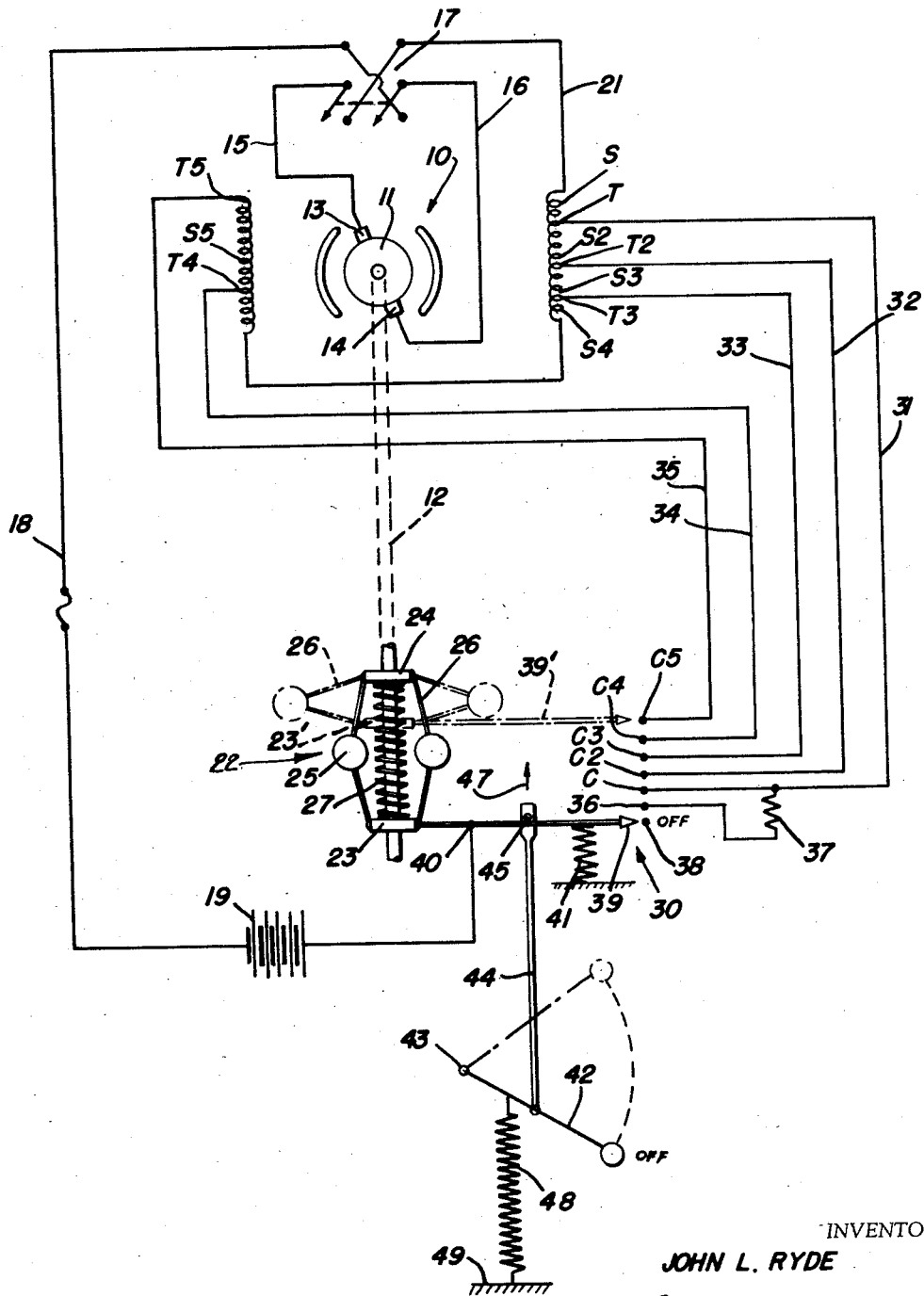

2,790,125

VARIABLE SPEED ELECTRIC MOTOR DRIVE SYSTEM

John L. Ryde, Los Angeles, Calif., assignor to McCulloch Motors Corporation, Los Angeles, Calif., a corporation of Wisconsin Application November 12, 1954, Serial No. 468,185

10 Claims. (Cl. 318—251)

This invention relates to a control system for variable speed electric motor drives and relates in particular to a variable speed electric motor drive system wherein a direct current electric motor is employed to drive a vehicle.

It is an object of the invention to provide a variable speed motor control system having a switch mechanism which is arranged to be moved in accordance with motor speed and having manually operated control means arranged to limit or override the action of the governor, the manually operable control member also being effective to bring the selector switch to off position independently of the action of the governor.

A further object of the invention is to provide a control system having a governor-moved contact arranged to traverse a series of stationary contacts which are consecutively connected to sections of the motor windings, the governor being arranged to position the movable contact in an off position when the motor is stopped, and there being means for effecting movement of the movable contact from its off position to a position where it will engage one of the series of stationary contacts to energize a section of the motor winding, thereby starting the motor, the action of the governor thereafter acting upon the switch so as to maintain electrical energization of the motor.

According to the present invention, a manually operable control member is arranged to limit the forward movement of the movable contact by the governor, thereby determining the maximum number of coil sections of the motor which may be energized.

Further objects and advantages of the invention may be brought out in the following part of the specification wherein a preferred embodiment of the invention has been described for the purpose of competent disclosure without the intention of limiting the scope of the invention set forth in the appended claims.

Referring to the drawing, comprising a single figure schematically showing the invention, a motor 10 is provided having a rotor equipped with the customary commutator 11 arranged to drive a shaft 12 which may be the motor shaft or may be the axle shaft of the vehicle. The motor 10 has brushes 13 and 14 connected respectively by conductors 15 and 16 with a reversing switch 17 so that either of the brushes 13 or 14 may be connected through a battery lead conductor 18 with a source of electric current shown as a battery 19.

The motor 10 has field coil winding means consisting of field coil sections S, S2, S3, S4 and S5, shown as being connected in series and as having taps T, T2, T3, T4 and T5 at the ends thereof, the beginning or front end of the first coil section S being connected by a conductor 21 with the reversing switch 17. Each succeeding coil section S2 to S5, inclusive has about 60% to 80% more turns than the coil preceding it.

The shaft member 12 is arranged to drive a governor 22 having a part 23 which moves from an initial position such as shown in full lines in the drawing toward a final position 23' as the speed of the shaft member 12 increases from zero to maximum. The member 23 is shown as being a collar which is slidable on the shaft member. The collar 23 is connected to a collar 24 which is fixed on the shaft 12 through use of conventional weights 25 and links 26, there being a compression spring 27 arranged between the collars 23 and 24 to exercise a control over the movement of the collar 23 by the governor weights 25 when they are rotated by the shaft 12.

A coil section selector switch 30 is provided having selector contacts C, C2, C3, C4 and C5, corresponding in number to the coil sections S—S5 and being consecutively connected to the ends of the coil sections through the respective taps thereof by conductors 31, 32, 33, 34 and 35. Ahead of and adjacent to the first stationary contact C there is at least one starting contact 36 connected through starting resistor means 37 with the conductor 31 to cushion the shock of starting the motor.

Ahead of the starting contact 36, which is at the front end of the series of contacts of the selector switch 30, there is an inactive contact 38 indicating the off position of a movable contact 39 arranged to be moved by an arm 40 from the position in which it is shown in full lines to the final position wherein it will engage the rear contact C5 when the arm 40 is moved to the position indicated at 39' by the governor 22. The arm 40 is attached to the movable collar 23, so that when the collar 23 is moved toward the position 23' the movable contact 39 will be caused to traverse the contacts 36 and C—C5 of the selector switch 30.

A spring 41 is arranged to yieldably exert a force tending to move the movable contact 39 from off position into engagement with one of the other contacts of the selector switch 30, for example, the starting contact 36, whereupon the operation of the motor 10 would be started. However, the spring 41 cannot move the contact 39 as described unless the supporting arm 40 is released from the control or restraint of control means consisting of a control lever 42 arranged to swing around a pivot 43 and being connected through a link 44 with a stop pin or body 45 which is arranged in the forward path of movement of the arm 40 when the control member 42 is in the off position in which it is shown in full lines. Accordingly, the spring 41 cannot move the movable contact 39 forwardly into engagement with the starting contact 36 until forward movement of the control member 42 shifts the stop pin 45 forwardly, or in the direction indicated by the arrow 47.

When the movable contact 39 engages the starting contact 36, electric current will flow from the battery 19 through the first coil section S of the motor 10 and rotation of the motor will start. This rotation of the motor will effect rotation of the governor 22 so that the movable collar 23 thereof will be moved forwardly, causing the movable contact 39 to appropriately traverse the stationary contacts C—C5, thereby connecting more of the coil sections S—S5 with the battery 19. In this manner there is an automatic selection of the proper number of field windings to match the motor speed to the load for best power and efficiency. The control member 42 however, exercises a manual control over the operation of the switch 30 by positioning of the stop pin 45 so as to limit the forward movement of the movable contact 39, thereby determining the number of coil sections energized at a selected time. A spring 48 has one end thereof connected to a stationary support 49 and the other end thereof connected to the control member 42, so that the tension of the spring member 48 will act through the link 44 and the stop 45, contrary to the forward motion of the arm 40 by the governor 22. For example the control member 42 may be shifted forwardly to fullest extent from the position thereof shown in full lines so as to move the stop pin into spaced relation to the arm 40. The arm 40 is then free to be moved first by the spring 41 and then by the governor 22 until it comes into its final position indicated by phantom lines 39' at which time the vehicle will be moving forwardly with minimum current consumption by the motor, as, for example, over a level surface. Should a slope be encountered, tending to slow the vehicle reduction in the speed of the motor shaft 12, it will cause the governor 22 to move the arm 40 back from its advanced position 39' into engagement with a preceding contact C4 or C3, disconnecting the coil section S5 and possibly the coil section S4, increasing the power consumption and torque of the motor 10.

The control member 22 forms a means for overriding the action of the governor 22, and under one selected condition the spring may be made only of such strength as to override the action of the spring 41. Under such condition manual forward movement of the lever, against the tension of the spring 48, will permit the spring 41 to move the arm 40 into a position wherein contact 39 will engage the starting contact 36 thereupon starting the operation of the motor 10. Thereafter, the governor 22 will advance the arm 40 unless the control member is held or pulled back toward "off" position. In an alternative selected condition, where the strength of the spring 48 is greater than the force the governor 22 is capable of exerting in the direction of the arrow 47, the control member 42 must be held forwardly against the action of the spring 48 to effect operation of the motor, and release of the control member 42 will permit the spring 48 to shut off the motor and stop the vehicle by pulling the contact 39 back into its starting position at the front end of the series of contacts 36 to C5.

I claim:

1. In a variable speed electric motor drive system: a series wound motor having a field winding comprising a plurality of coil sections connected in series with taps at the ends thereof, each of said sections having about sixty percent to eighty percent more turns than the preceding section; a field selector switch having a series of field contacts connected consecutively to the taps of said sections of said field winding, at least one starting contact with a starting resistor arranged at the front end of said series of field contacts, a movable contact arranged to be moved forwardly from an off position to said starting contact and then from the front end to the rear end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; a spring arranged to move said movable contact from said off position thereof to said starting contact; a second spring arranged so as to exert force tending to move said movable contact rearwardly across said series of contacts to said starting position; and a control member arranged so as to control the effect of said second spring upon said movable contact.

2. In a variable speed electric motor drive system: a series wound motor having a field winding comprising a plurality of coil sections connected in series with taps at the ends thereof, each of said sections having about sixty percent to eighty percent more turns than the preceding section; a field selector switch having a series of field contacts connected consecutively to the taps of said sections of said field winding, at least one starting contact with a starting resistor arranged at the front end of said series of field contacts, a movable contact arranged to be moved forwardly from an "off" position to said starting contact and then from beginning to end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; a spring arranged to move said movable contact from said "off" position thereof to said starting contact; a control member arranged to limit the movement of said movable contact by said governor; and means for effecting retention of said movable contact in said "off" position.

3. In a variable speed electric motor drive system: a series wound motor having a field winding comprising a plurality of coil sections connected in series with taps at the ends thereof; a field selector switch having a series of field contacts connected consecutively to the taps of said sections of said field winding, at least one starting contact with a starting resistor arranged at the front end of said series of field contacts, a movable contact arranged to be moved forwardly from an off position to said starting contact and then from beginning to end of said series of field contacts progressively increasing the number of said sections energized as it moves from said front end to said rear end of said series of field contacts; a governor driven by the rotating part of the motor and having connected to said movable contact so as to move the same from said starting contact toward the end of said series of contacts as the motor speed increases; a spring arranged to move said movable contact from said off position thereof to said starting contact; a second spring arranged so as to exert force tending to move said movable contact rearwardly across said series of contacts to said starting position; and a control member arranged so as to control the effect of said second spring upon said movable contact.

4. In a variable speed electric motor drive system: a series wound motor having a field winding comprising a plurality of coil sections connected in series with taps at the ends thereof; a field selector switch having a series of field contacts connected consecutively to the taps of said sections of said field winding, at least one starting contact with a starting resistor arranged at the front end of said series of field contacts, a movable contact arranged to be moved forwardly from an off position to said starting contact and then from beginning to end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; a spring arranged to move said movable contact from said off position thereof to said starting contact; a control member arranged to limit the movement of said movable contact by said governor; and means for effecting retention of said movable contact in said off position.

5. In a variable speed electric motor drive system; a series wound motor having a field winding comprising a plurality of coil sections connected in series; a field selector switch having a series of field contacts connected consecutively to the ends of said sections of said field winding, at least one starting contact with a starting resistor arranged at the front end of said series of field contacts, a movable contact arranged to be moved forwardly from an off position to said starting contact and then from beginning to end of said series of field contacts progressively increasing the number of said sections energized at its moves from said front end to said rear end of said series of field contacts; a governor driven by the rotating part of the motor and being connected to said movable contact so as to move the same from said starting contact toward the end of said series of contacts as the motor speed increases; a spring arranged to move said movable contact from said off position thereof to said starting contact; a second spring arranged so as to exert force tending to move said movable contact rearwardly across said series of contacts to said starting position; and a control member arranged so as to control the effect of said second spring upon said movable contact.

6. In a variable speed electric motor drive system; a series wound motor having a field winding comprising a plurality of coil sections connected in series, each of said sections having about sixty percent to eighty percent more turns than the preceding section; a field selector switch having a series of field contacts connected consecutively to the ends of said sections of said field winding, at least one starting contact with a starting resistor arranged at the front end of said series of field contacts, a movable contact arranged to be moved forwardly from an off position to said starting contact and then from beginning to end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; a spring arranged to move said movable contact from said off position thereof to said starting contact; a control member arranged to limit the movement of said movable contact by said governor; and means for effecting retention of said movable contact in said off position.

7. In a variable speed electric motor drive system; a series wound motor having a field winding comprising a plurality of coil sections connected in series, each of said sections having about sixty percent to eighty percent more turns than the preceding section; a field selector switch having a series of field contacts connected consecutively to the ends of said sections of said field winding, at least one starting contact with a starting resistor arranged at the front end of said series of field contacts, a movable contact arranged to be moved forwardly from an off position to said starting contact and then from beginning to end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; a control member arranged to limit the movement of said movable contact by said governor; and means for moving said movable contact from said off position to said starting contact.

8. In a variable speed electric motor drive system: a series wound motor having a field winding comprising a plurality of coil sections connected in series, each of said sections having about sixty percent to eighty percent more turns than the preceding section; a field selector switch having a series of field contacts connected consecutively to the ends of said sections of said field winding, at least one starting contact, a movable contact arranged to be moved forwardly from an off position to said starting contact and then from beginning to end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; a control member arranged to limit the movement of said movable contact by said governor; and means for moving said movable contact from said off position to said starting contact.

9. In a variable speed electric motor drive system: a series wound motor having a field winding comprising a plurality of coil sections connected in series, each of said sections having about sixty percent to eighty percent more turns than the preceding section; a field selector switch having a series of field contacts connected consecutively to the ends of said sections of said field winding, a movable contact arranged to be moved forwardly from beginning to end of said series of field contacts progressively increasing the number of said sections energized as it moves from said front end to said rear end of said series of field contacts; a governor driven by the rotating part of the motor and being connected to said movable contact so as to move the same from consecutively from the front end to the end of said series of contacts as the motor speed increases; a control member arranged to limit the movement of said movable contact by said governor; and means for energizing one of said field coils so as to start the motor.

10. In a variable speed electric motor drive system: a series wound motor having a field winding comprising a plurality of coil sections connected in series, each of said sections having about sixty percent to eighty percent more turns than the preceding section: a field selector switch having a series of field contacts connected consecutively to the ends of said sections of said field winding, a movable contact arranged to be moved forwardly from beginning to end of said series of field contacts progressively increasing the number of said sections energized as it moves from said front end to said rear end of said series of field contacts; a governor driven by the rotating part of the motor and being connected to said movable contact so as to move the same from said starting contact toward the end of said series of contacts as the motor speed increases; and means for energizing one of said field coils so as to start the motor.

References Cited in the file of this patent

UNITED STATES PATENTS

| | | |
|---|---|---|
| 295,454 | Sprague | Mar. 18, 1884 |
| 313,247 | Sprague | Mar. 3, 1885 |
| 313,546 | Sprague | Mar. 10, 1885 |
| 682,642 | Sachs | Sept. 17, 1901 |